US010214256B2

(12) United States Patent
Rehberg (10) Patent No.: US 10,214,256 B2
(45) Date of Patent: Feb. 26, 2019

(54) ADJUSTABLE AND REMOVABLE TRACK ASSEMBLY FOR A TRACTOR

(71) Applicant: DEERE & COMPANY, Moline, IL (US)

(72) Inventor: Michael A. Rehberg, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 94 days.

(21) Appl. No.: 15/375,632

(22) Filed: Dec. 12, 2016

(65) Prior Publication Data

US 2017/0305483 A1  Oct. 26, 2017

Related U.S. Application Data

(60) Provisional application No. 62/327,498, filed on Apr. 26, 2016.

(51) Int. Cl.
*B62D 55/065* (2006.01)
*B62D 55/084* (2006.01)
*B62D 55/125* (2006.01)

(52) U.S. Cl.
CPC ......... *B62D 55/065* (2013.01); *B62D 55/084* (2013.01); *B62D 55/125* (2013.01)

(58) Field of Classification Search
CPC ...... B62D 55/065; B62D 49/06; B62D 55/08; B62D 55/084
See application file for complete search history.

(56) References Cited

U.S. PATENT DOCUMENTS

| 4,341,276 A | * | 7/1982 | Furuichi | B62D 55/084 180/9.48 |
| 5,072,800 A | * | 12/1991 | Price | B62D 55/08 180/9.48 |
| 5,622,234 A | * | 4/1997 | Nagorcka | B62D 55/08 180/9.5 |

(Continued)

FOREIGN PATENT DOCUMENTS

| DE | 602004009208 T2 | 6/2008 |
| WO | WO91/16229 A1 | 10/1991 |

OTHER PUBLICATIONS

German Patent and Trademark Office, Search Report issued in German Application No. 102017204956.1, dated Mar. 26, 2018, 12 Pages.

*Primary Examiner* — Kevin Hurley
*Assistant Examiner* — Michael R Stabley
(74) *Attorney, Agent, or Firm* — Taft Stettinius & Hollister LLP; Stephen F. Rost (57) ABSTRACT

A tractor includes a frame including an axle, the axle including an axle shaft and a beam member. A cab is mounted to the frame, the cab including controls for controlling the tractor. A ground-engaging mechanism coupled to the axle, the second ground-engaging mechanism including a track assembly. The track assembly includes an undercarriage assembly, a carrier housing, a ring gear, and a track, where the carrier housing includes a pivot arm for pivoting coupling to the undercarriage assembly. The ring gear defines an outer diameter, and the axle shaft and beam member are adjustably coupled to the carrier housing at a location inside the outer diameter.

20 Claims, 6 Drawing Sheets

(56) References Cited

U.S. PATENT DOCUMENTS

| | | | | |
|---|---|---|---|---|
| 6,176,334 B1* | 1/2001 | Lorenzen | ............... | B62D 21/14 |
| | | | | 180/9.46 |
| 6,318,484 B2* | 11/2001 | Lykken | .............. | B62D 49/0678 |
| | | | | 180/9.1 |
| 6,374,933 B1* | 4/2002 | Ruppert, Jr. | ........... | B62D 21/14 |
| | | | | 180/9.44 |
| 8,662,216 B2* | 3/2014 | Roucka | .............. | B62D 49/0678 |
| | | | | 180/9.46 |
| 2001/0004951 A1* | 6/2001 | Pertusi | ................. | B62D 55/084 |
| | | | | 180/291 |
| 2009/0321151 A1* | 12/2009 | Archambault | ..... | B62D 49/0678 |
| | | | | 180/9.21 |
| 2014/0224555 A1* | 8/2014 | Qian | .................... | B62D 55/084 |
| | | | | 180/9.48 |

* cited by examiner

ADJUSTABLE AND REMOVABLE TRACK ASSEMBLY FOR A TRACTOR

RELATED APPLICATIONS

The present application claims priority to U.S. Provisional Patent Application Ser. No. 62/327,498, filed Apr. 26, 2016, the disclosure of which is incorporated by reference in its entirety.

FIELD OF THE DISCLOSURE

The present disclosure relates to a tractor, and in particular to a track assembly for a tractor.

BACKGROUND OF THE DISCLOSURE

Tractors and other work machines may include one or more ground-engaging mechanisms for propelling the machine along a ground or underlying surface. In many cases, these mechanisms include one or more wheels. In other machines, these mechanisms may include one or more track assemblies. For agricultural tractors, particularly those configured to row crop functionality, many conventional tractors with track assemblies are designed to operate at a single setting for a given application.

SUMMARY

In one embodiment of the present disclosure, a tractor includes a frame including an axle, the axle including an axle shaft and a beam member; a cab mounted to the frame, the cab including controls for controlling the tractor; a ground-engaging mechanism coupled to the axle, the second ground-engaging mechanism including a track assembly; the track assembly including art undercarriage assembly, a carrier housing, a ring gear, and a track, the carrier housing including a pivot arm for pivoting coupling to the undercarriage assembly; wherein, the ring gear defines an outer diameter, and the axle shaft and beam member are adjustably coupled to the carrier housing at a location inside the outer diameter.

In one example, the carrier housing is adjustably coupled to the axle shaft and beam member to allow the track assembly to be movably adjusted in a fore and aft direction relative to the frame. In a second example, the track assembly comprises a single modular unit that is adjustably and slidably coupled to the axle shaft and beam member. In a third example, the pivot arm defines a pivot axis about which the undercarriage assembly pivots relative to the carrier housing, the pivot axis being located inside the outer diameter. In a fourth example, the undercarriage assembly comprises a first idler wheel, a second idler wheel, an undercarriage frame, and at least one bogey wheel. In a fifth example, the track is disposed in tension about the outer diameter of the ring gear, the first idler wheel, the second idler wheel, and the at least one bogey wheel such that an outer periphery of the track forms a substantially triangular shape.

In a sixth example, a first angle is defined by a first portion of the track that is in contact with the first idler wheel, and a second angle is defined by a second portion of the track that is in contact with the second idler wheel, where a first line bisecting the first angle intersects with a second line bisecting the second angle at the pivot axis. In a seventh example, the ring, gear includes a sprocket with openings defined along its outer diameter, and the track comprises lugs along an inner portion thereof, the lugs receivably engaged with the openings as the track moves about the outer diameter of the ring gear. In an eighth example, wherein the track assembly includes a hub assembly, a sleeve, and a drive gear, the hub assembly and sleeve being coupled to one another to form a compressive coupling between the track assembly and the axle shaft. In a ninth example, the hub assembly comprises a first portion and a second portion.

In a tenth example, the sleeve is tapered from a first end to a second end thereof to define a sleeve ramp, and the hub assembly is tapered from a first end to a second end thereof to define a hub ramp, the sleeve ramp and huh ramp being in contact with one another when the track assembly is coupled to the axle shaft. In an eleventh example, the sleeve includes an outer face with a plurality of openings defined in the outer face, where fasteners mechanically couple the sleeve to the hub assembly. In a twelfth example, as the sleeve is coupled to the hub assembly, the sleeve ramp slides in contact with the hub ramp to apply a compressive force against the axle shaft. In another example, the track assembly and axle shaft form a planetary gearset including a sun, a carrier assembly, a pinion, and a ring, where the axle shaft is the sun, the carrier housing, is the carrier assembly, the ring gear is the ring, and the drive gear is the pinion. In a further example, the beam member defines a plurality of holes spaced about its length in a longitudinal direction, the track assembly being removably coupled at any location along the length of the beam member via a fastener mechanically coupling the track assembly to the beam member via at least one of the plurality of holes.

In another embodiment of this disclosure, a track assembly for coupling to an axle of a work machine includes an undercarriage assembly including a first idler wheel, a second idler wheel, an undercarriage frame, and at least one bogey wheel; a carrier housing including a pivot arm for pivoting coupling to the undercarriage assembly; a ring gear defining an outer diameter and circumscribing the carrier housing; a drive gear configured to be rotatably coupled to an drive input of the axle, the drive gear rotatably coupled to the ring gear; wherein, the carrier housing is configured to be adjustably coupled to the axle at a location inside the outer diameter.

In one example of this embodiment, the pivot arm defines a pivot axis about which the undercarriage assembly pivots relative to the carrier housing, the pivot axis being located inside the outer diameter. In a second example, the track is disposed in tension about the outer diameter of the ring gear, the first idler wheel, the second idler wheel, and the at least one bogey wheel such that an outer periphery of the track forms a substantially triangular shape; and a first angle is defined by a first portion of the track that is in contact with the first idler wheel, and a second angle is defined by a second portion of the track that is in contact with the second idler wheel, where a first line bisecting the first angle intersects with a second line bisecting the second angle at the pivot axis.

In a third example, the track assembly may include a hub assembly, a sleeve, and a drive gear, the hub assembly and sleeve being coupled to one another to form a compressive coupling between the track assembly and the axle shaft. In another example, the sleeve is tapered from a first end to a second end thereof to define a sleeve ramp, and the hub assembly is tapered from a first end to a second end thereof to define a hub ramp, the sleeve ramp and hub ramp being slidably coupled to one another when the track assembly is coupled to the axle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
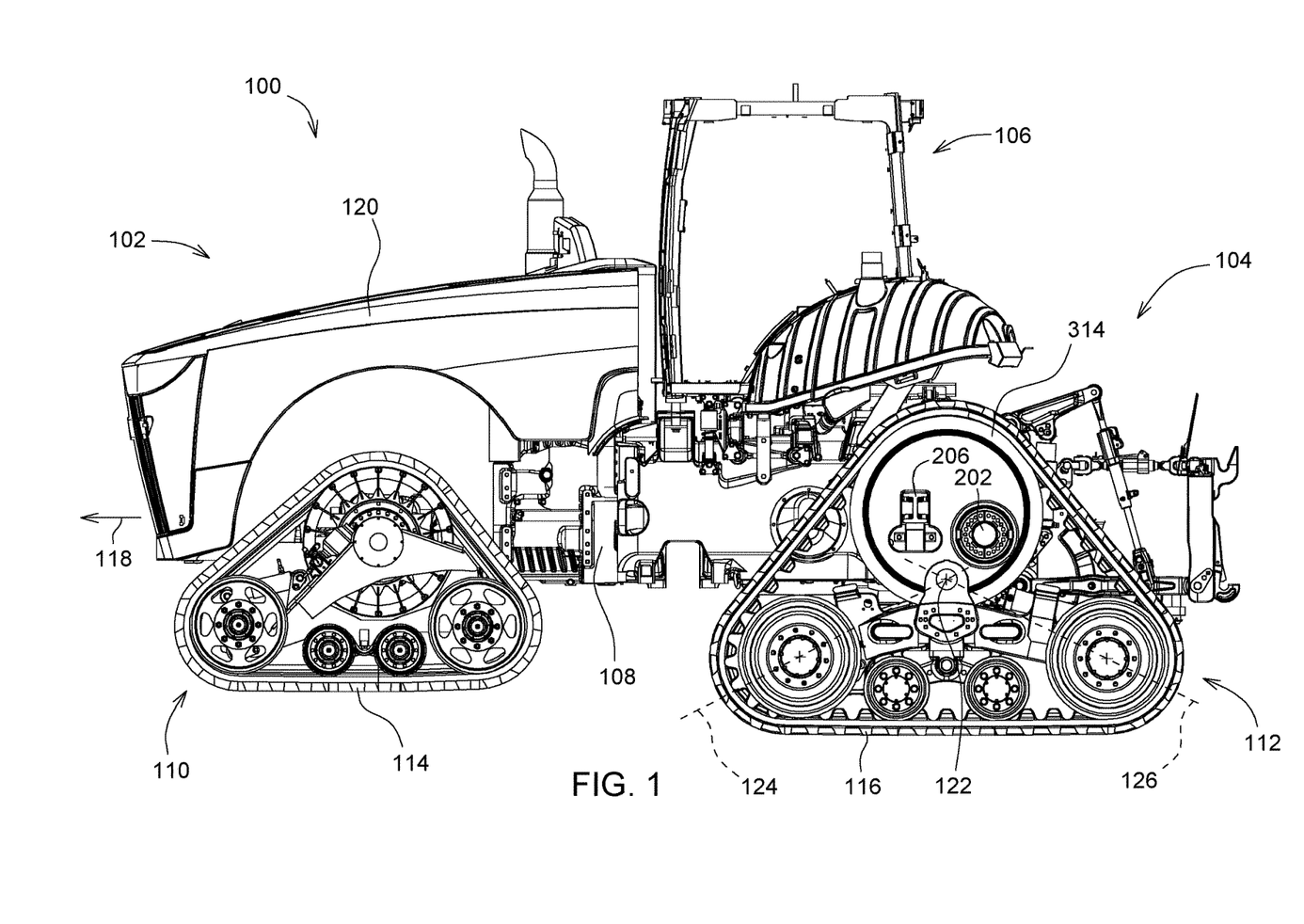
FIG. 1 is a side view of a four-track tractor.

Referring to FIG. 1, a tractor 100 for performing a work function is disclosed. The tractor 100 may move in a forward direction of travel as indicated by arrow 118 to perform the work function. The tractor 100 may include a frame 108 supported by a first ground-engaging mechanism 110 and a second ground-engaging mechanism 112. The first and second ground-engaging mechanisms are illustrated as track assemblies, but in other embodiments, these mechanisms may each take the form of a wheel or other known mechanism. The first ground-engaging mechanism or track assembly 110 may include its own independently-driven track 114, and the second ground-engaging mechanism or track assembly 112 may include its own independently-driven track 116.

The first track assembly 110 may be coupled to a front axle (not shown) at a front portion 102 of the tractor 100. The second track assembly 112 may be coupled to a rear axle (not shown) at a rear portion 104 of the tractor. Although only one side of the tractor 100 is shown, it is understood that a similar arrangement of structure may be provided on the opposite side thereof.

As also shown, a cab assembly 106 may be mounted to the frame 108 of the tractor 100. The cab assembly 106 may include an operator's seat (not shown) and controls (not shown) for operating the tractor 100. The seat may be provided for a tractor operator to face the front portion 102 of the tractor 100 while operating or controlling the tractor 100. In addition, an engine compartment 120 may be provided for housing an engine, prime mover, motor, or other known power-generating device. The engine compartment 120 may be mounted to the frame 108 of the tractor 100.

In the embodiment of FIG. 1, a four-track tractor 100 is shown. Here, the first track assembly 110 is mounted to the front axle and the second track assembly 112 is mounted to the rear axle. Likewise, another track assembly 110 may be mounted on the opposite side of the tractor 100 to the front axle, and another track assembly 112 may be mounted on the opposite side of the tractor 100 to the rear axle. In this case, there are four total track assemblies mounted to the tractor 100. One of the challenges here is utilizing a four track system for a row crop application. In a row crop application, it may be desirable to adjust the width of the track assemblies for different row widths in a field. For example, it may be necessary to adjust for a 22" row, a 30" row, a 40" row, etc. In many conventional systems, a track assembly may bolt directly to a drive hub of a front axle with appropriate bearing support. This fixed system does not permit any adjustability for adjusting the width between belts at either the front or rear axle.

Moreover, with many conventional systems, one must remove an entire track assembly and belt, drain fluid from an axle housing, mount a large cast metal spacer to the axle, and then reattach the track assembly and fill the axle housing with fluid. Wet joints and the like often increase the complexity and time it takes to make any adjustments to the space between tracks. Further, adjusting or setting belt tension can be difficult with conventional track assemblies.

Figure 2:
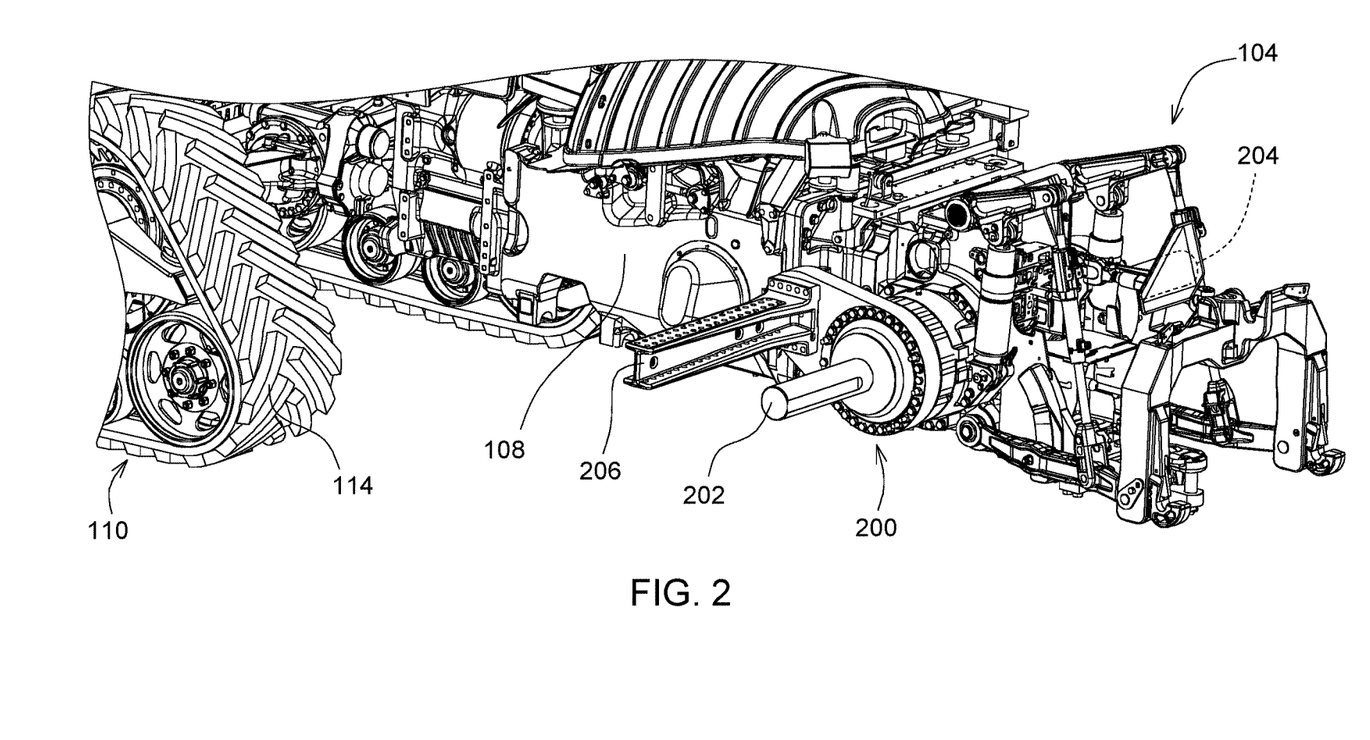
FIG. 2 is a partial perspective view of a rear axle assembly of the four-track tractor of FIG. 1.

In FIGS. 1-5, an embodiment is shown of the second track assembly 112 shown as a self-contained modular unit that allows for better adjustability than conventional systems. Moreover, the tension of the belt 116 may be established more easily without removing, and disassembling the track assembly. In FIG. 2, for example, the frame 108 of the tractor 100 is shown. Here, the rear axle 200 of the tractor 100 may include a final drive assembly (not shown) that drives an axle drive shaft (or, referred to herein as an axle shaft). The axle shaft 202 may be rotationally driven to drive the track assembly 112. A beam member 206 in the form of an I-beam is also shown. The beam member 206 may be formed of a cast iron or steel to provide structural rigidity to the system. The beam member 206 may be offset from the axle shaft 202 as shown. Moreover, the beam member 206 may include a plurality of mounting holes 312 which may be used for coupling the track assembly 112 thereto. This will be described in further detail below.

While only one side of the tractor 100 is primarily shown in FIG. 2, a second axle shaft 204 is shown on the opposite side of the tractor 100. The first axle shaft 202 and second axle shaft 204 may be coaxial with one another. Each may be coupled to and rotatably driven by separate final drive assemblies. Alternatively, each may be coupled to and rotatably driven by the same final drive assembly.

Figure 3:
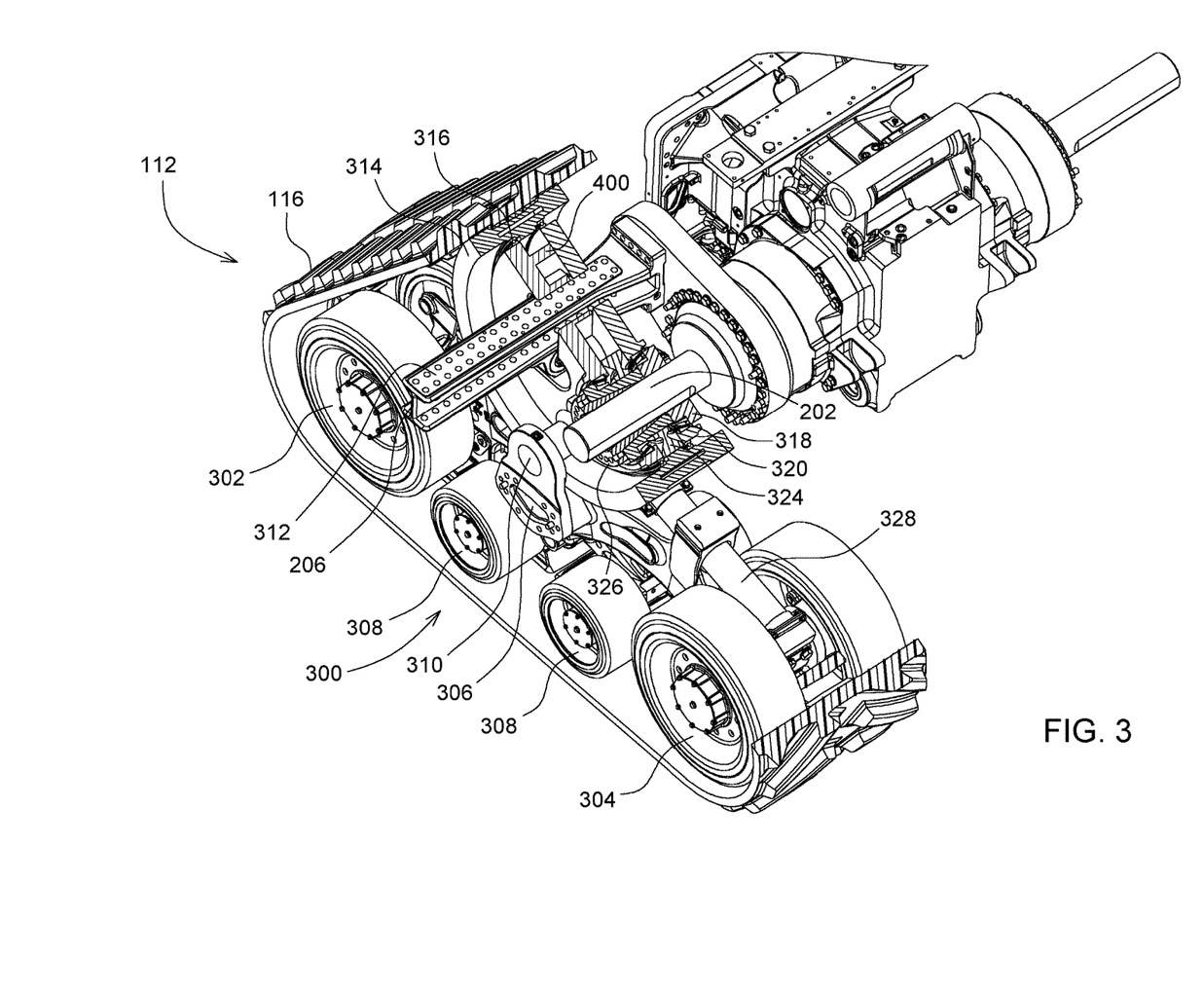
FIG. 3 is a partial perspective and cross-sectional view of a track assembly coupled to the rear axle assembly of FIG. 2.

The axle shaft 202 and beam member 206 are configured to support an undercarriage assembly 300, as shown in FIG. 3. The beam member 206 provides support to the undercarriage assembly 300 at the front thereof, whereas the axle shaft 202 offers support at the rear thereof. As shown in FIGS. 1 and 3, the track assembly 112 forms a triangularly-shaped assembly whereas the track 116 may be tensioned about the undercarriage assembly 300 towards the ground and a drive wheel towards the top. The undercarriage assembly 300 may include a first idler wheel 302 towards the front of the assembly 300 and a second idler wheel 304 towards the rear thereof. Each idler wheel may be in rotational contact with the belt 116.

Figure 4A:
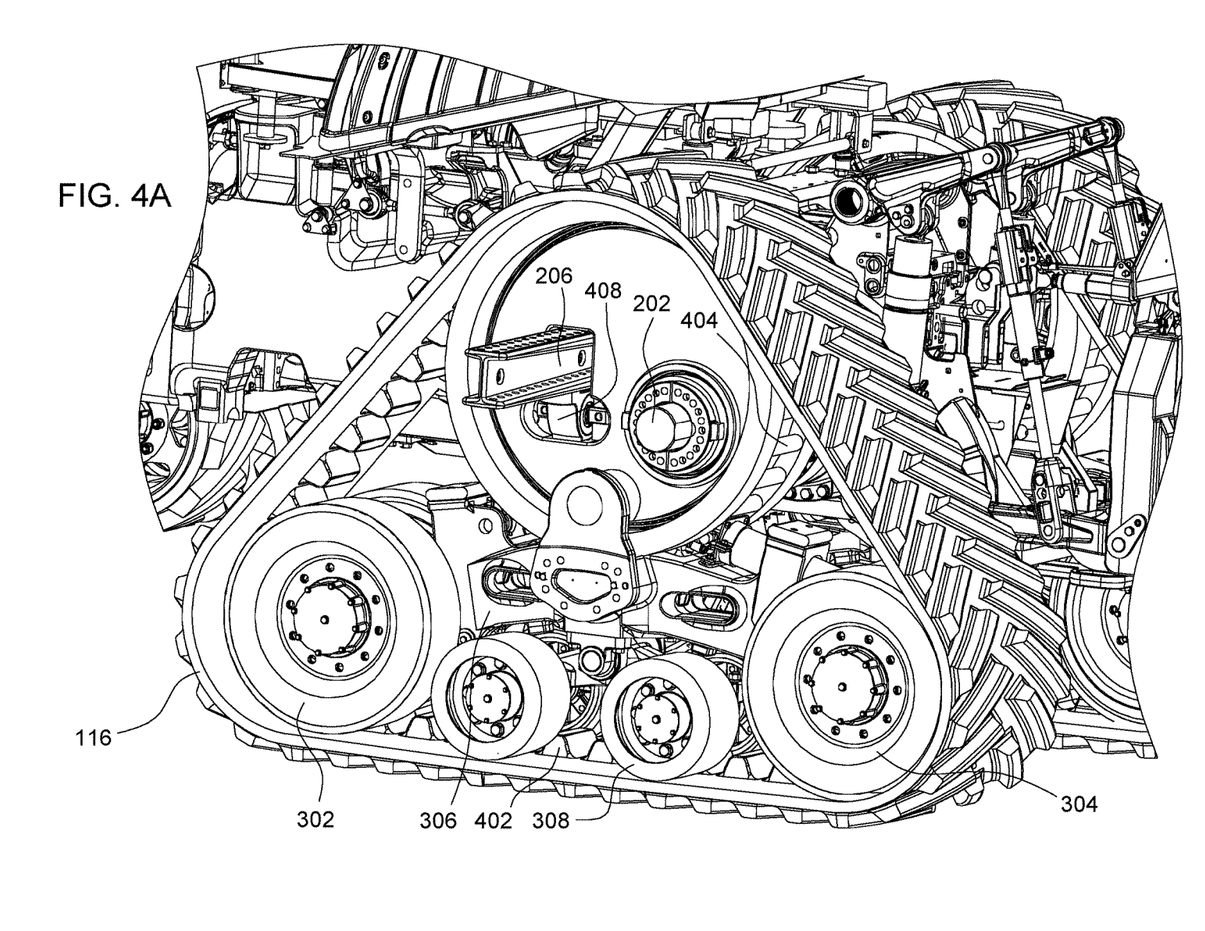
FIG. 4A is a rear perspective view of the track assembly.

The undercarriage assembly 300 may further include one or more bogey wheels 308. The bogey wheels 308 and idler wheels may be coupled to an undercarriage frame 306 as shown in FIG. 3. As also shown, the undercarriage assembly 300 may be pivotably coupled to a structural cast member such as a carrier housing 400 (FIG. 4A). An undercarriage pivot arm 310 is coupled to or integrally formed with the carriage housing 400, and the arm 310 defines a pivot axis 122 about which the undercarriage assembly 300 pivots.

Figure 4B:
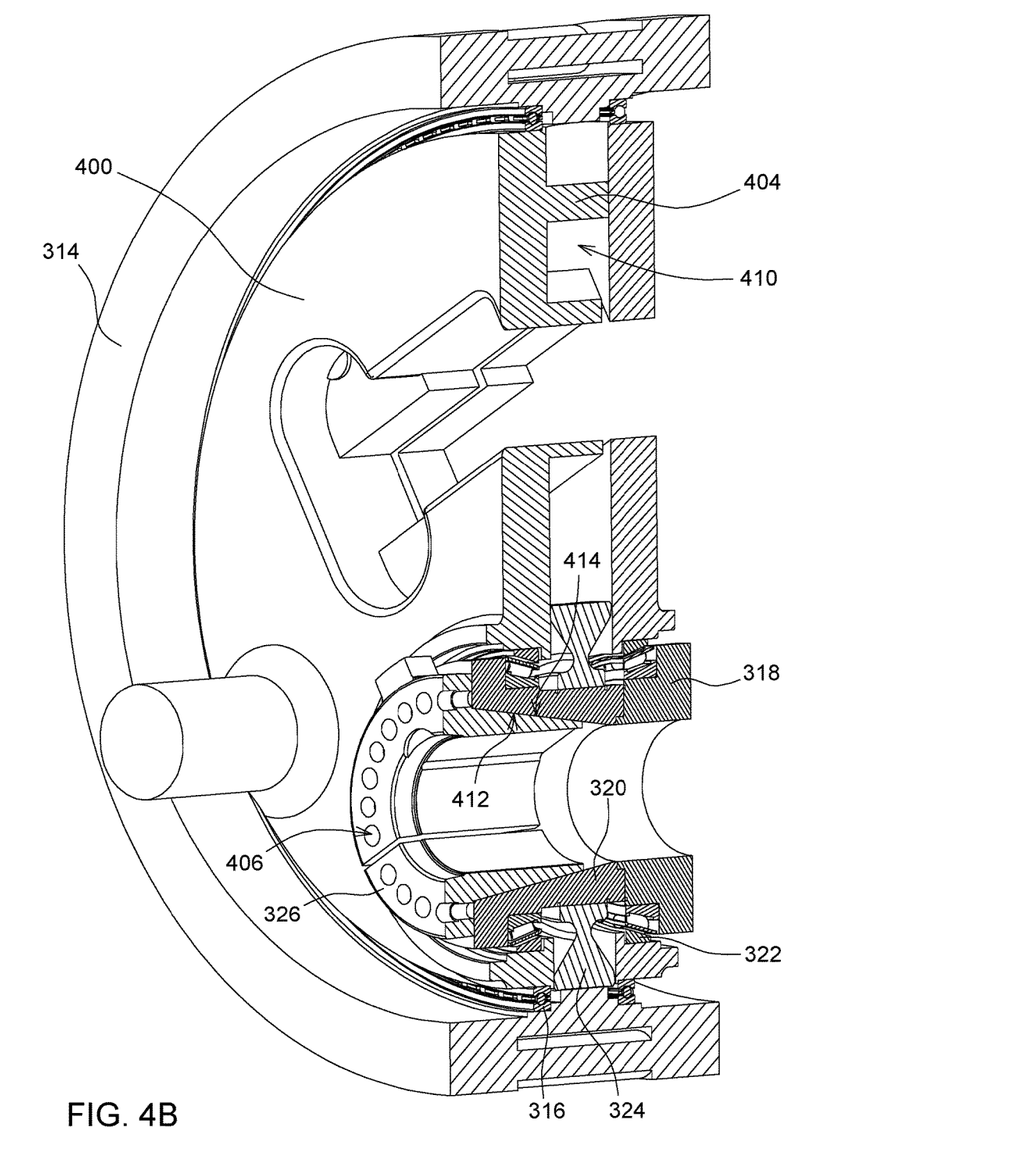
FIG. 4B is a perspective cross-sectional view of the track assembly.

The carrier housing 400 is part of a planetary-style gearset that includes an outer ring gear sprocket 314. The ring gear sprocket 314 forms a connection with the track 116 such that torque is input received by the sprocket 314 drives the track 116. As shown in FIG. 4B, the ring gear sprocket 314 may include a plurality of sprocket members 404 spaced radially about the sprocket 314. A gap or opening 410 may be defined between adjacent sprocket members 404. The track 116 may include a plurality of lugs 402 radially spaced about an inner surface or diameter of the track 116. Each lug 402 is of a shape and size that may be received in the gap or opening 410. When the lug 402 is received within the opening 410, rotational movement of the ring gear sprocket 314 imparts a force against the one or more lugs 402 that are coupled to the sprocket 314 for rotationally driving the track 116 about the sprocket 314.

The ring gear sprocket 314 may be rotationally driven by a drive gear 324. The drive gear 324 is rotationally coupled to the axle shaft 202 via a hub assembly and tapered sleeve 326. The hub assembly may include a first hub member 318 and a second hub member 320. A first bearing assembly 316 may be disposed between the carrier housing 400 and the ring gear sprocket 314, and a second bearing 322 may be disposed between the hub assembly and the carrier housing 400. Each bearing may be ball bearing, tapered roller bearing, or any other known type of bearing.

As shown in this embodiment, the carrier housing 400 is such that the axle shaft 202, beam member 206, and undercarriage pivot arm 310 are located within an outer diameter of the ring gear sprocket 314. This embodiment addresses several problems in the art. First, with respect to adjusting the width or space between tracks or tread setting, the track assembly 112 is designed as a single modular unit that is slidably coupled to the axle shaft 202 and beam member 206. In other words, the track assembly 112 may be removed as an entire assembly from the axle by de-coupling it to the axle shaft 202 and beam member 206 and slidably adjusting its mounting location along the shaft and beam member. Unlike conventional systems, the entire assembly may be adjusted at the same time without disassembling the assembly into separate parts.

In addition, stability and speed capability are achieved in this design. As shown in FIG. 1, the undercarriage pivot arm 310 is located within an outer diameter of the ring gear sprocket 314. As shown, the triangular-shaped track assembly 112 forms a first curvature near a top end of the track 116 where the track 116 moves about the ring gear sprocket 314. A second curvature is located towards the bottom of the track 116 at a front location and a third curvature is located towards the bottom of the track 116 at a rear location. The front location corresponds to where the track 116 is in contact with the front idler wheel 302 and the rear location corresponds to where the track 116 is in contact with the rear idler wheel 304.

The second and third curvatures may form angles defined by a portion of the track that travels along the ground and a portion of the track between the first and second curvatures and a portion of the track between the first and third curvatures. As shown in FIG. 1, a first line 124 is shown bisecting the angle formed by the track that intersects the second curvature of the track 116. Moreover, a second line 126 is shown bisecting the angle formed by the track 116 that intersects the third curvature. In this embodiment, the first line 124 and second line 126 intersect one another at the pivot axis 122 of the undercarriage assembly 300, which is defined by the undercarriage pivot arm 310. The location of this pivot axis 122 provides stability to the track assembly 112.

With the pivot axis 122 located within the diameter of the ring gear sprocket 314, the carrier housing 400 provides the necessary support and structural rigidity necessary to mount the pivot at this location. In addition, the size or diameter of the ring gear sprocket is sufficiently large such that as many lugs 402 of the track 116 engage within the openings 410 formed in the sprocket 314. This can reduce wear on the lugs 402 and increase overall reliability of the track assembly 112. The lugs 402 are less likely to slip or jump about the ring gear sprocket 314 or drive wheel under different breaking or tractive loads. With the diameter of the sprocket 314 being sufficiently large, the speed capability of the track assembly 112 may be improved.

Another aspect of this disclosure is the improved process tore adjusting the location of the track assembly 112 relative to the axle shaft 202 and beam member 206, and the ease with which the tension in the track 116 may be achieved. As previously described, the track assembly 112 may be a self-contained and self-supported structure. Belt or track tension may be achieved or set via the ring gear sprocket 314, the carrier housing 400, the pivot arm 310 and undercarriage assembly 300. In other words, the tension is contained within an outer periphery defined by the track 116.

When installing the track 116 and setting its tension, a cylinder (not shown) may be provided to exert a force against a pivot joint to move or induce movement to a top portion of the front idler wheel 302 in a forward direction. This can achieve tension in the track 116. An accumulator 328, shown in FIG. 3, may be provided to maintain tension or pressure in the track 116 at a location behind or inboard of the undercarriage assembly 300. The cylinder may induce or stretch the track around the idler wheels and ring gear sprocket 314, and in doing so, the track 116 can exert a downward force against the sprocket 314. Moreover, the axle shaft 202 provides torque to drive the sprocket 314, but it also provides structural support to the overall track assembly and track tension.

As previously described, the track assembly 112 is capable of being adjusted towards or away from the tractor frame 108. In other words, the track assembly on one side of the tractor may be adjusted towards or away from the track assembly on the opposite side thereof. As such, the width or spacing between track assemblies may be adjusted to a desired location. In doing so, the track assembly 112 can be adjusted relative to the axle shaft 202 and beam member 206, both of which are fixedly coupled to the frame 108.

As previously described, the axle shaft 202 acts as a sun gear of the planetary gearset arrangement. For coupling the track assembly 112 to the axle shaft 202, the hub assembly may slide along and clamp to the shaft 202. The first hub portion 318 and second hub portion 320 may be a single piece, or alternatively, each may be removably coupled to one another to form the hub assembly. In any event, the second hub portion 320 may be tapered from its inner side to its outer side. For purposes of this embodiment, the inner side of the second hub portion 320 is located nearest the first hub portion 318, and the outer side of the second hub portion 320 is located furthest from the first hub portion 318 (see FIG. 4B). The tapered edge of the second hub portion 320 defines a hub ramp 412.

The tapered sleeve 326 may include a plurality of bolt apertures 406 defines in its outer face, as shown in FIG. 4B. The tapered sleeve 326 may further include a tapered width that tapers from its outer side to its inner side. In this embodiment, the inner side of the tapered sleeve 326 is shown closest to the first hub portion 318, and the outer side is furthest from the first hub portion 318. The outer face of the tapered sleeve 326 may be formed at the outer side thereof. The tapered sleeve 326 therefore defines a sleeve ramp 414 that tapers from the outer side to the inner side of the sleeve. The plurality of bolt apertures 406 may pass completely through the tapered sleeve 326 from the outer side to the inner side thereof.

The coupling of the tapered sleeve 326 to the hub assembly provides the clamping force to couple the track assembly 112 to the axle shaft 202. For example, bolts or other fasteners may be used to mechanically couple the tapered sleeve 326 to the second hub portion 320. As the bolts or fasteners are tightened, the sleeve ramp 414 is in contact with and slides along the hub ramp 412. The bolts or fasteners may be aligned with corresponding holes (not shown) in the second hub portion 320 for coupling the sleeve and hub assembly together. Moreover, as the sleeve 326 and second hub portion 320 are coupled to one another, the sleeve 326 moves axially inwardly toward the first hub portion 318 so that the sleeve moves closer and compresses against the axle shaft 202. In this embodiment, the drive gear 324 is rotationally coupled to the axle shaft 202 such that as the axle shaft 202 rotates, the drive gear 324 also rotates and transfers torque to the ring gear sprocket 314.

In addition to the compressive coupling of the track assembly 112 to the axle shaft 202, the track assembly 112 may also be coupled to the beam member 206. As previously described and shown in FIG. 3, the beam member 206 may include a plurality of holes 312 aligned and spaced from one another longitudinally along the member 206. Bolts or other fasteners may be used for coupling the track assembly 112 to the beam member 206. For instance, the carrier housing 400 may include a ball joint 408 as shown in FIG. 4B. The ball joint 408 may include one or more openings for receiving the bolts or other fasteners. Thus, the openings in the ball joint 408 may be aligned with one or more of the plurality of holes 312 in the beam member 206 for coupling the track assembly 112 to the beam member 206.

The number of holes 312 in the beam member 206, and the spacing thereof relative to one another, may allow for tolerance or compliance coupling between the beam member 206 and the ball joint 408. On the other hand, the coupling between the tapered sleeve 326 and the axle shaft 202 may be substantially rigid or fixed with respect to fore and aft alignment and vertical alignment. In other words, the coupling to the axle shaft 202 may provide minimal tolerance or adjustability, whereas the coupling to the beam member 206 allows for tolerance or adjustability between the track assembly 112 and the beam member 206.

In the illustrated embodiment, axle structure including the axle shaft 202 and beam member 206 pass through a portion of the drive wheel (e.g., sprocket 314) for coupling the track assembly 112 to the rear axle of the tractor 100. The center of the drive wheel is coupled about a structurally fixed axle shaft 202 to allow the drive wheel or sprocket to rotate about the fixed structure. With the axle shaft 202 being fixed, the ball joint 408 may be decoupled from the beam member 206 and the tapered sleeve 326 loosened or removed from the axle shaft 202 to permit sliding movement of the track assembly 112 relative to the axle. In this configuration, the mounting capability and torque capability passes through a portion of the drive wheel rather than around it.

Figure 5:
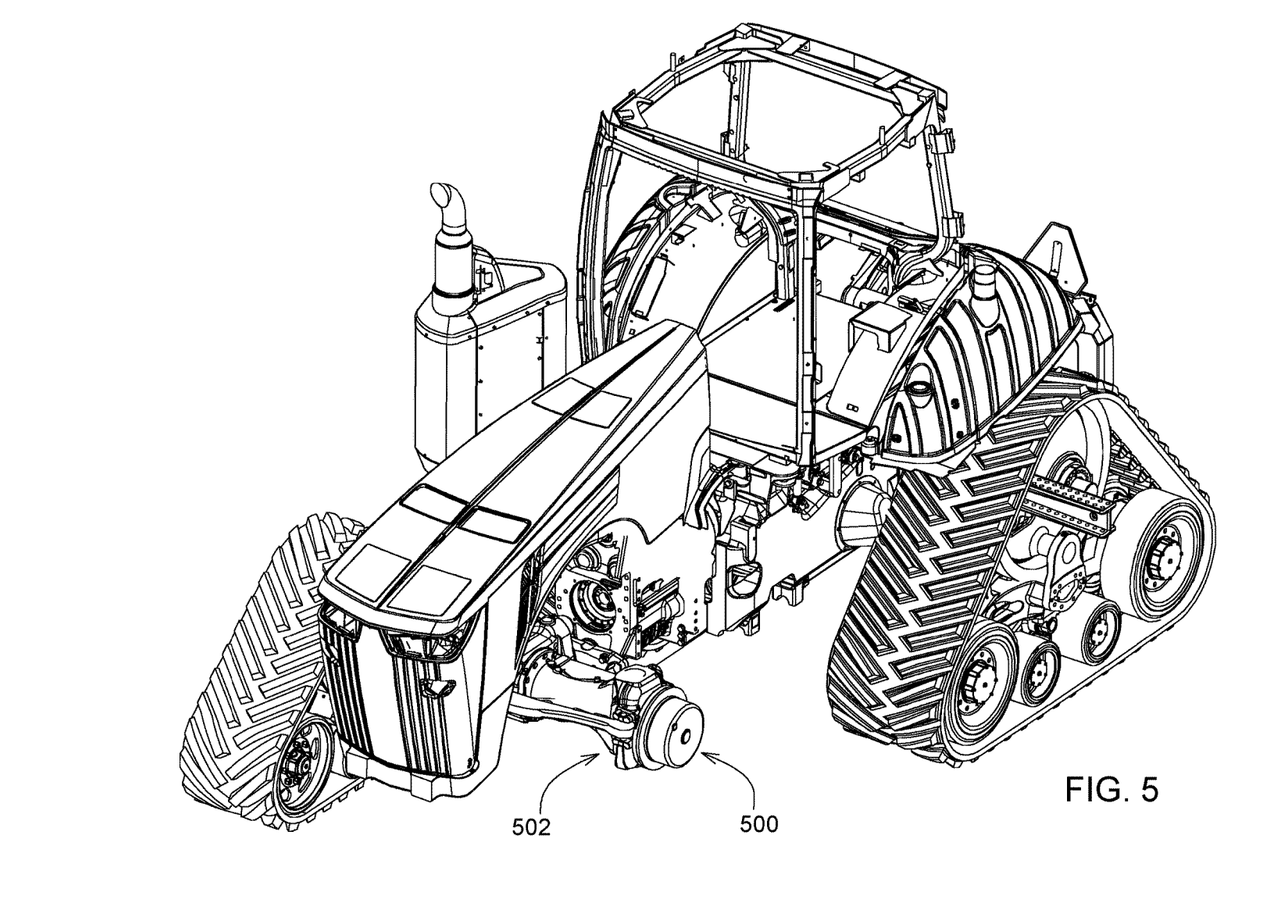
FIG. 5 is a front perspective view of a front axle of the tractor of FIG. 1.

In this disclosure, the adjustable track assembly has been shown and described with respect to the rear axle of the tractor 100. In another embodiment, however, the track assembly may also be operably coupled to the front axle of the tractor 100. In some cases, the front axle of the tractor 100 may be disposed lower to the ground compared to the rear axle. With this, the track assembly is coupled to the front axle in such a way to maintain sufficient ground clearance. With the triangular-shaped track assembly 112, the axle shaft may be rotatably driven by a final drive assembly 500 as shown in FIG. 5. Here, an outboard final drive assembly 500 may include a planetary gearset located within the housing for providing gear reduction. A cast knuckle and spindle housing 502 may also be provided for mounting the track assembly to the front axle.

To achieve sufficient ground clearance, the axle shaft at the front axle may be positioned lower than the beam member. In one example, the axle shaft may be disposed lower and the beam member higher than the axle shaft to provide adequate support. There may be no need for a riser box or a gear-to-gear arrangement in this configuration. As such, the track assembly may be coupled to a steering knuckle that pivots relative to a kingpin bearing (not shown) so there is pivotal movement relative to the ground rather than being fixed as with the rear axle. In other words, as front wheels may be turned at an angle relative to the forward direction of travel 118, the front axle may be designed to accommodate the track assembly and permit some pivotal movement so that the tractor 100 can turn.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A tractor, comprising:
    a frame including an axle, the axle including an axle shaft and a beam member;
    a cab mounted to the frame, the cab including controls for controlling the tractor;
    a ground-engaging mechanism coupled to the axle, the ground-engaging mechanism including a track assembly;
    the track assembly including an undercarriage assembly, a carrier housing, a ring gear, and a track, the carrier housing including a pivot arm for pivoting coupling to the undercarriage assembly;
    wherein, the ring gear defines an outer diameter, and the axle shaft and beam member are adjustably coupled to the carrier housing at a location inside the outer diameter.

2. The tractor of claim 1, wherein the carrier housing is adjustably coupled to the axle shaft and beam member to allow the track assembly to be movably adjusted in a fore and aft direction relative to the frame.

3. The tractor of claim 2, wherein the track assembly comprises a single modular unit that is adjustably and slidably coupled to the axle shaft and beam member.

4. The tractor of claim 1, wherein the pivot arm defines a pivot axis about which the undercarriage assembly pivots relative to the carrier housing, the pivot axis being located inside the outer diameter.

5. The tractor of claim 4, wherein the undercarriage assembly comprises a first idler wheel, a second idler wheel, an undercarriage frame, and at least one bogey wheel.

6. The tractor of claim 5, wherein the track is disposed in tension about the outer diameter of the ring gear, the first idler wheel, the second idler wheel, and the at least one bogey wheel such that an outer periphery of the track forms a substantially triangular shape.

7. The tractor of claim 5, wherein a first angle is defined by a first portion of the track that is in contact with the first idler wheel, and a second angle is defined by a second portion of the track that is in contact with the second idler wheel, where a first line bisecting the first angle intersects with a second line bisecting the second angle at the pivot axis.

8. The tractor of claim 1, wherein the ring gear comprises a sprocket with openings defined along its outer diameter, and the track comprises lugs along an inner portion thereof, the lugs receivably engaged with the openings as the track moves about the outer diameter of the ring gear.

9. The tractor of claim 1, wherein the track assembly comprises a hub assembly, a sleeve, and a drive gear, the hub assembly and sleeve being coupled to one another to form a compressive coupling between the track assembly and the axle shaft.

10. The tractor of claim 9, wherein the hub assembly comprises a first portion and a second portion.

11. The tractor of claim 9, wherein the sleeve is tapered from a first end to a second end thereof to define a sleeve ramp, and the hub assembly is tapered from a first end to a second end thereof to define a hub ramp, the sleeve ramp and hub ramp being in contact with one another when the track assembly is coupled to the axle shaft.

12. The tractor of claim 11, wherein the sleeve comprises an outer face with a plurality of openings defined in the outer face, where fasteners mechanically couple the sleeve to the hub assembly.

13. The tractor of claim 11, wherein as the sleeve is coupled to the hub assembly, the sleeve ramp slides in contact with the hub ramp to apply a compressive force against the axle shaft.

14. The tractor of claim 9, wherein the track assembly and axle shaft form a planetary gearset including a sun, a carrier assembly, a pinion, and a ring, where the axle shaft is the sun, the carrier housing is the carrier assembly, the ring gear is the ring, and the drive gear is the pinion.

15. The tractor of claim 1, wherein the beam member defines a plurality of holes spaced about its length in a longitudinal direction, the track assembly being removably coupled at any location along the length of the beam member via a fastener mechanically coupling the track assembly to the beam member via at least one of the plurality of holes.

16. A track assembly for coupling to an axle of a work machine, comprising:
a track;
an undercarriage assembly including a first idler wheel, a second idler wheel, an undercarriage frame, and at least one bogey wheel;
a carrier housing including a pivot arm for pivoting coupling to the undercarriage assembly;
a ring gear defining an outer diameter and circumscribing the carrier housing;
a drive gear configured to be rotatably coupled to 1 drive input of the axle, the drive gear rotatably coupled to the ring gear;
wherein, the carrier housing is configured to be adjustably coupled to the axle at a location inside the outer diameter.

17. The track assembly of claim 16, wherein the pivot arm defines a pivot axis about which the undercarriage assembly pivots relative to the carrier housing, the pivot axis being located inside the outer diameter.

18. The track assembly of claim 16, wherein:
the track is disposed in tension about the outer diameter of the ring gear, the first idler wheel, the second idler wheel, and the at least one bogey wheel such that an outer periphery of the track forms a substantially triangular shape; and
a first angle is defined by a first portion of the track that is in contact with the first idler wheel, and a second angle is defined by a second portion of the track that is in contact with the second idler wheel, where a first line bisecting the first angle intersects with a second line bisecting the second angle at the pivot axis.

19. The track assembly of claim 16, further comprising a hub assembly, a sleeve, and a drive gear, the hub assembly and sleeve being coupled to one another to form a compressive coupling between the track assembly and the axle shaft.

20. The track assembly of claim 19, wherein the sleeve is tapered from a first end to a second end thereof to define a sleeve ramp, and the hub assembly is tapered from a first end to a second end thereof to define a hub ramp, the sleeve ramp and hub ramp being slidably coupled to one another when the track assembly is coupled to the axle.

* * * * *